United States Patent Office 3,404,102
Patented Oct. 1, 1968

3,404,102
POLYCYCLIC EPOXIDE COMPOSITIONS AND RESINS PRODUCED THEREFROM
Paul S. Starcher and Samuel W. Tinsley, Charleston, and Bertrand D. Ash, St. Albans, W. Va., assignors to Union Carbide Corporation, a corporation of New York
No Drawing. Filed Apr. 9, 1964, Ser. No. 358,607
27 Claims. (Cl. 260—2)

ABSTRACT OF THE DISCLOSURE

Epoxide monomers, and resins thereof, which contain 2 to 4 epoxy groups existing in saturated aliphatic substituents bonded through an oxy, carbonyloxy, oxyalkylene or carbonyloxyalkylene group to a bicyclo[2.2.1]heptyl ring or a larger fused homocarbocyclic ring of which a bicyclo[2.2.1]heptyl ring is an integral part. The resins are used as clear coatings and laminations.

---

This invention relates to novel polymerizable monomers and to polymerizable and polymerized compositions produced therefrom. More particularly, this invention relates to novel bicycloheptylene epoxides and to resins produced therefrom.

Epoxide resins have found wide application in a wide variety of applications such as coatings, adhesives, molding, laminating and the like. The number of various epoxy monomers available have enabled the worker at times to tailor make the resin for the particular use contemplated. For example if a room temperature curable epoxy resin is desired, linear polyepoxides such as diglycidyloxy butane or aromatic polyepoxides such as a polyglycidyl polyether of a bisphenol would be suitable. However, the low heat distortion temperature of the linear polyepoxide resins and the sensitivity of resins from aromatic epoxides to ultraviolet light present drawbacks to the use of either of these monomers. Cycloaliphatic epoxides such as bis(2,3-epoxycyclopentyl) ether, on the other hand, are not sensitive to ultraviolet light and have sufficiently high heat distortion temperatures for most applications, however such epoxides are not curable at room temperature. Consequently, despite the diversity of epoxide monomers available, in many instances certain desirable properties must be compromised to achieve a resin having the characteristics which are absolutely demanded in the intended utility.

In accordance with the instant invention are provided novel epoxide monomers which are admirably suitable for the production of resins which possess none of the disadvantages heretofore attributable to the resins of the prior art. Moreover in one aspect the polymerized compositions of this invention provide uniquely clear and colorless resins which are resistant to discoloration from ultraviolet light, and hence are ideal as clear coatings or for laminations where clarity and whiteness are desired.

The polymerizable compositions of this invention can be readily handled in resin-forming operations such as coating, laminating, bonding, molding, casting, potting, and the like. These polymerizable compositions are capable of accepting solid materials, such as fillers and pigments, for providing various effects in physical properties and coloration. With or without such added solid materials, the polymerizable compositions can be made to fill small intricacies of molds without the necessity of applying high pressures or heating to high temperatures, although such measures can be employed, if desired. The polymerizable compositions also can be easily spread, brushed, or sprayed by many techniques available in the paint, lacquer, and varnish industries for making coatings and finishes. Negligible shrinkage, if any, occurs in curing to the resin. The polymerizable compositions are capable of being accurately shaped by molds having intricate molding surfaces and fully cured to resins carrying exact details of such molding surfaces. They can be also advantageously employed in the potting of such fragile articles as electronic components.

The curable, polymerizable compositions of the invention also can be partially reacted at elevated temperatures to form viscous thermosetting liquids or thermosetting solids. The resulting fusible thermosetting intermediate reaction products can be dissolved in an inert normally-liquid organic medium and applied as heat-curable coatings. To aid solution, the thermosetting solid products can be powdered or granulated, if desired. The thermosetting solids also can be used as molding powder compositions which can be converted to fully cured solid products by the application of heat and/or pressure. Numerous other uses, applications, and unexpected advantages and results will become apparent upon a consideration of the various embodiments of the inventin which are discussed hereinafter.

The novel polymerizable monomers of this invention are ethers or carboxylate compounds containing from 2 to 4 vicinal epoxy groups, the said epoxy groups of said monomers existing on saturated aliphatic substituents joined to a fused homocarbocyclic ring system through a bifunctional linkage selected from the group consisting of oxy, carbonyloxy, oxyalkylene, and carbonyloxyalkylene, the said fused homocarbocyclic ring system being selected from the group consisting of the bicyclo[2.2.1]heptyl ring, larger non-aromatic homocarbocyclic fused rings containing up to 6 carbocycles of which a bicyclo[2.2.1]heptyl ring is an integral part, and the alkyl substituted derivatives of said rings. Accordingly the novel monomers of this invention are comprised of carbon and hydrogen and are free from additional atoms other than oxygen in the form of oxy groups, vicinal epoxy groups, and carbonyloxy groups. The said alkyl substituents on said fused carbocyclic ring system have from 1 to 4 carbon atoms, preferably.

Thus the novel monomers of this invention comprehend compounds characterized by (1) a fused carbocyclic ring system containing from 2 to 6 carbocycles and containing a bicyclo[2.2.1]heptyl structure, and the alkyl substituted derivatives thereof (2) from 2 to 4 vicinal epoxy groups existing on saturated aliphatic substituents and (3) the said vicinal epoxy groups being linked to said fused homocarbocyclic ring through a linkage selected from the group consisting of oxy (—O—), carbonyloxy

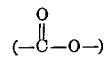

oxyalkylene (—O—C$_n$H$_{2n}$—), and carbonyloxyalkylene

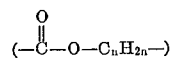

wherein $n$ is from 1 to 4 and preferably is 1 so that the linkage is preferably through an oxy, carbonyloxy, oxymethylene, or carbonyloxymethylene moiety.

More precisely the novel polyepoxy monomers contemplated by the instant invention may be represented by the following structural formulae

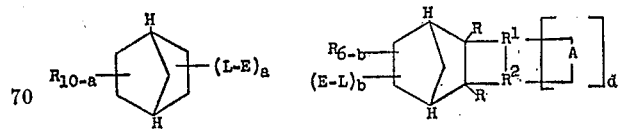

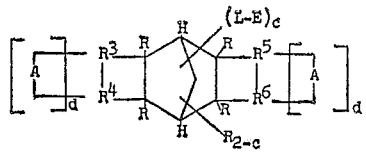

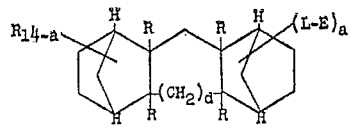

wherein
- *a* represents an integer from 2 to 4,
- *b* represents an integer from 0 to 4,
- *c* represents an integer from 0 to 1, and
- *d* in each instance taken individually represents an integer of from 0 to 1, and also wherein R in each instance taken separately represents hydrogen or alkyl, preferably of from 1 to 4 carbon atoms, and wherein (L—E) represents the linking radical bonded to the epoxy containing group so that L itself represents a divalent linking radical selected from the group consisting of oxy, carbonyloxy, oxyalkylene and carbonyloxyalkylene, and E itself represents a monovalent saturated epoxy containing aliphatic radical such as epoxyalkyl, epoxycycloalkyl, epoxycycloalkylalkyl, and epoxyalkylcycloalkyl, preferably of 2 to 18 carbon atoms, $R^1$ to $R^6$ represent saturated radicals of the formula:

$$(C_nH_{2n-(d+c)})-(L-E)_e$$

wherein *n* is an integer from 1 to 4 and *e* is from 0 to 2, and A represents a radical of the formula:

$$(C_mH_{2m-f})-(L-E)_f$$

wherein *m* is an integer from 1 to 2 and *f* is an integer from 0 to 1.

It is pointed out that the R substituents and the (L—E) groups in the above structural formulae may occupy any free position on the ring structure.

In a preferred aspect the novel polyepoxy monomers of this invention are characterized by a fused homocarbocyclic ring structure containing from 2 to 6 carbocycles, each carbocycle containing from 4 to 8 carbon atoms, preferably 5 to 6 carbon atoms. Accordingly ring systems which are preferred include fused ring systems which may be synthesized by a Diels Alder reaction of cyclopentadiene and other cyclic and linear conjugated dienes such as 1,3-cyclohexadiene, 1,3-butadiene, 1,3-pentadiene, 1,3-hexadiene, and the like, together with an ethylenic or acetylenic dienophile which together with said diene will form a fused homocarbocyclic ring system containing a bicyclo[2.2.1]heptyl ring as an integral part thereof. Illustrative of the basic ring systems which may characterize the novel compounds of this invention are among others the following:

bicyclo[2.2.1]heptyl

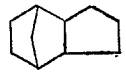

tricyclo[5.2.1.0$^{2,6}$]decyl

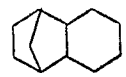

tricyclo[6.2.1.0$^{2,7}$]undecyl

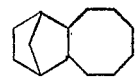

tricyclo[8.2.1.0$^{2,9}$]tridecyl

tetracyclo[6.2.1$^{3,6}$.0$^{2,7}$]dodecyl

tetracyclo[6.2.2.1$^{3,6}$.0$^{2,7}$]tridecyl

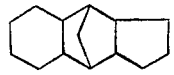

tetracyclo[6.5.1.0$^{2,7}$.0$^{9,13}$]tetradecyl

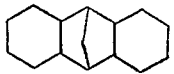

tetracyclo[6.6.1.0$^{2,7}$.0$^{9,14}$]pentadecyl

tetracyclo[8.6,1.0$^{2,9}$.0$^{11,16}$]heptadecyl

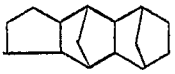

pentacyclo[6.5.1.1$^{3,6}$.0$^{9,13}$]pentadecyl

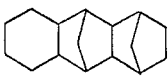

pentacyclo[6.6.1.1$^{3,6}$.0$^{9,14}$]hexadecyl

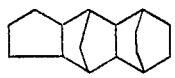

pentacyclo[9.2.2.1$^{3,9}$.0$^{4,8}$]hexadecyl

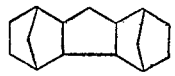

pentacyclo[9.2.1.1$^{5,8}$.0$^{2,10}$.0$^{4,9}$]pentadecyl

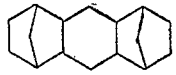

pentacyclo[10.2.1.1$^{5,8}$.0$^{2,11}$.0$^{4,9}$]hexadecyl

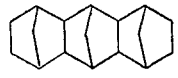

hexacyclo[6.6.1.1$^{3,6}$.1$^{10,13}$]heptadecyl and the like including the alkyl substituted derivatives of the above homocarbocyclic ring systems wherein the alkyl substituents contain from 1 to 4 carbon atoms.

The epoxy substituents being from 2 to 4 in number exist on saturated aliphatic groups which are bonded to the homocarbocyclic ring structure through a bivalent linking radical selected from the group consisting of oxy, carbonyloxy, oxyalkylene, and carbonyloxyalkylene, wherein the alkylene portions are preferably methylene or ethylene. Thus preferably the bivalent linking groups could be represented as follows as linking one epoxy group to a bicyclo[2.2.1]heptyl ring

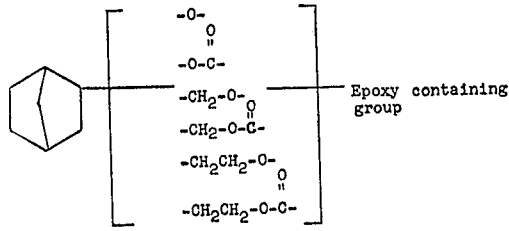

Inasmuch as the novel monomers contain from 2 to 4 epoxy groups per molecule, it is pointed out that the bivalent linking groups need not be the same in each instance in the monomer molecule. As is apparent from the structures depicted above, the epoxy containing substituents are the epoxidized residues of aliphatic acids and alcohols. The epoxy substituents may contain from 2 to 18 carbon atoms, preferably from 2 to 8 carbon atoms, the vicinal epoxy group itself being removed by at least one carbon atom from the oxy atom in the bivalent linking radical. The carbon atom separating the epoxy group from the oxy atom in the linking radical may be a carbonyl or an aliphatic carbon atom, so that when the linking group is an oxy group or an oxyalkylene group, the smallest epoxy-containing radical designated by E contemplated would be 2,3-epoxy propyl, whereas when the linking group is carbonyloxy or carbonyloxyalkylene group, the smallest epoxy radical designated by E would be 1,2-epoxyethyl. Highly preferred monomers are those wherein the epoxy groups are contained in 2,3-epoxypropyl, i.e., glycidyl, group linked to the homocarbocyclic ring by an oxy or an oxyalkylene group.

Accordingly, illustrative of the epoxy-containing substituents represented by the combination (L—E) in the foregoing structural formulae are, among others, the following: 2,3-epoxypropoxy, 2,3-epoxypropoxymethyl, 2,3-epoxypropoxyethyl, 2,3-epoxypropanoyloxy, 2,3-epoxypropanoyloxymethyl, 2,3-epoxypropanoyloxyethyl, 3,4-epoxybutoxy, 3,4-epoxybutoxymethyl, 2-ethyl-5,6-epoxyhexoxy, 4,5-epoxypentanoyloxy, 3,4-epoxycyclohexoxy, 2,3-epoxycyclopentoxymethyl, 2-methyl-3,4-epoxycyclohexanoyloxy, 4-ethyl-2,3-epoxycyclopentanoyloxymethyl and the like.

The novel polyepoxy ether and carboxylate monomers of this invention include, among others the following:

2,5-bis(2,3-epoxypropoxy)bicyclo[2.2.1]heptane,
2,3,5-tris(2,3-epoxypropoxy)bicyclo[2.2.1]heptane,
2,3,5,7-tetrakis(2,3-epoxypropoxy)bicyclo[2.2.1]heptane,
2,6-bis(9,10-epoxydecoxy)bicyclo[2.2.1]heptane,
2,3,5-tris(3,4-epoxybutoxymethyl)bicyclo[2.2.1]heptane,
2,6-bis(3,4-epoxycyclohexoxy)bicyclo[2.2.1]heptane,
2,7-bis(2,3-epoxycyclopentoxymethyl)bicyclo[2.2.1]heptane,
2,3-bis(2,3-epoxypropanoyloxy)bicyclo[2.2.1]heptane,
2,5,6,7-tetrakis(3,4-epoxybutanoyloxyethyl)bicyclo[2.2.1]heptane,
2-ethyl-3,6-bis(11,12-epoxydodecoxy)bicyclo[2.2.1]heptane,
2,5-dipropyl-3,6-bis(2,3-epoxypropanoyloxymethyl)bicyclo[2.2.1]heptane,
2-butyl-3-(2,3-epoxypropoxy)-5-(3,4-epoxycyclohexylmethoxy)bicyclo[2.2.1]heptane,
2-methyl-3-(2,3-epoxypropyloxy)-5-(2,3-epoxypropanoyl)bicyclo[2.2.1]heptane,
7-methyl-2-(3,4-epoxybutoxymethyl)-5-(3,4-epoxycyclohexoxy)bicyclo[2.2.1]heptane,
2(2,3-epoxycyclopentanoyl)-6-(3,4-epoxybutoxy)bicyclo[2.2.1]heptane,
2-(2,3-epoxypropyloxy)-5-(9,10-epoxydecoxy)bicyclo[2.2.1]heptane,
2-(2,3-epoxypropanoyl)5-(3,4-epoxycyclohexanoyl)bicyclo[2.2.1]heptane,
3,8-bis(2,3-epoxypropoxy)tricyclo[4.2.1.0$^{2,5}$]nonane,
3-methyl-4,9-bis(2,3-epoxypropoxy)tricyclo[5.2.1.0$^{2,6}$]decane,
3,4,8,10-tetrakis(2,3-epoxypropoxy)tricyclo[5.2.1.0$^{2,6}$]decane,
3,7-bis(2,3-epoxypropoxymethyl)tricyclo[4.2.1.0$^{2,5}$]nonane,
3,8-dimethyl-4,9-(2,3-epoxypropanoyloxy)tricyclo[5.2.1.0$^{2,6}$]decane,
3,5,8-tris(3,4-epoxycyclohexylmethoxy)tricyclo[5.2.1.0$^{2,6}$]decane,
3-methyl-4,10-bis(2,3-epoxycyclopentanoyloxy)tricyclo[6.2.1.0$^{2,7}$]undecane,
8,9-dimethyl-3,4-bis(3,4-epoxybutanoyloxyethyl)tricyclo[5.2.1.0$^{2,6}$]decane,
3-(2-methyl-3,4-epoxycyclohexoxy)-8,9-bis(2,3-epoxypropoxy)tricyclo[5.2.1.0$^{2,6}$]decane,
3-methyl-5-(3,4-epoxybutanoyloxy)-9,10-bis(3,4-epoxybutoxy)tricyclo[6.2.1.0$^{2,7}$]undecane,
4-(3,4-epoxycyclohexoxymethyl)-11-(2,3-epoxypropoxy)tricyclo[6.2.1.0$^{2,7}$]undecane,
3,4-bis(2-ethyl-5,6-epoxyhexoxy)-10-(3,4-epoxybutoxy)tricyclo[5.2.1.0$^{2,6}$]decane,
4,5,9,10-tetrakis(2,3-epoxypropoxy)tricyclo[5.2.1.0$^{2,6}$]decane,
4,10-bis(2,3-epoxypropoxy)tetracyclo[6.2.1.1$^{3,6}$.0$^{2,7}$]dodecane,
3,11-bis(2,3-epoxypropoxy)tricyclo[8.2.1.0$^{2,9}$]tridecane,
4,11,12-tris(2,3-epoxypropoxymethyl)tetracyclo[6.2.1.1$^{3,6}$.0$^{2,7}$]dodecane,
4,12-bis(2,3-epoxypropanoyloxy)tetracyclo[6.4.1.0$^{2,7}$.0$^{9,12}$]tridecane,
3-methyl-5,11-bis(3,4-epoxycyclohexylmethoxy)tetracyclo[6.5.1.0$^{2,7}$.0$^{9,13}$]tetradecyl,
4-methyl-5,9-bis(2,3-epoxycyclopentanoyloxy)tetracyclo[6.2.1.1$^{3,6}$.0$^{2,7}$]dodecane,
4,8-bis(2-methyl-3,4-epoxybutanoyloxyethyl)tetracyclo[6.4.1.0$^{2,7}$.0$^{9,12}$]tridecane,
4-(3,4-epoxybutanoyloxy)-12-(3,4-epoxybutoxy)tetracyclo[6.2.1.1$^{3,6}$.0$^{2,7}$]dodecane,
3-(3,4-epoxycyclohexoxymethyl)-14-(2,3-epoxypropoxy)tetracyclo[6.5.1.0$^{2,7}$.0$^{9,13}$]tetradecane,
3-ethyl-4-(2-ethyl-5,6-epoxyhexoxy)-13-(3,4-epoxybutoxy)tetracyclo[6.4.1.0$^{2,7}$.0$^{9,12}$]tridecane,
4,10-bis(2,3-epoxypropoxy)-9-(2,3-epoxypropoxymethyl)tetracyclo[6.2.1.1$^{3,6}$.0$^{2,7}$]dodecane,
4,5,15-bis(2,3-epoxypropoxy)tetracyclo[6.6.1.0$^{2,7}$.0$^{9,14}$]pentadecane,
4,6-bis(2,3-epoxypropoxy)tetracyclo[8.6.1.0$^{2,9}$.0$^{11,16}$]heptadecane,
4-methyl-9,10-bis(2,3-epoxypropoxy)tetracyclo[6.2.2.1$^{3,6}$.0$^{2,7}$]tridecane,
4,9-dimethyl-5,10-bis(2,3-epoxypropoxymethyl)tetracyclo[6.2.1.1$^{3,6}$.0$^{2,7}$]dodecane,
4,14-bis(2,3-epoxypropanoyloxy)tetracyclo[6.6.1.0$^{2,7}$.0$^{9,14}$]pentadecane,
5,15-bis(3,4-epoxycyclohexylmethoxy)tetracyclo[8.6.1.0$^{2,9}$.0$^{11,16}$]heptadecane,
4,13-bis(2,3-epoxycyclopentanoyloxy)tetracyclo[6.2.2.1$^{3,6}$.0$^{2,7}$]tridecane,
4,5-dimethyl-9,10-bis(3,4-epoxybutanoyloxyethyl)tetracyclo[6.2.1.1$^{3,6}$.0$^{2,7}$]dodecane,
4-(2-methyl3,4-epoxycyclohexoxy)-13-(2,3-epoxypropoxy)tetracyclo[6.6.1.0$^{2,7}$.0$^{9,14}$]pentadecane,
3-methyl-4,6-bis(2,3-epoxypropoxy)-15-(2,3-epoxypropoxymethyl)tetracyclo[8.6.1.0$^{2,9}$.0$^{11,16}$]heptadecane,
4,5-bis(3,4-epoxybutanoyloxy)-11-(3,4-epoxybutoxy)tetracyclo[6.2.2.1$^{3,6}$.0$^{2,7}$]tridecane,
4,10-bis(2,3-epoxypropoxy)pentacyclo[6.4.1.1$^{3,6}$.0$^{4,12}$]tetradecane,
4,5,11-tris(2,3-epoxypropoxy)pentacyclo[6.5.1.1$^{3,6}$.0$^{9,12}$]pentadecane, 4-methyl-5,12-bis(2,3-epoxypropoxy)pentacyclo
[6.6.1.1$^{3,6}$.0$^{9,14}$]hexadecane,
4,16-bis(2,3-epoxypropoxy)pentacyclo[9.2.2.1$^{3,9}$.0$^{4,8}$]
hexadecane,
4-ethyl-5,10,11-tris(2,3-epoxypropoxymethyl)pentacyclo
[6.5.1.1$^{3,6}$.0$^{9,12}$]pentadecane,
4,13-bis(2,3-epoxypropanoyloxy)pentacyclo
[6.6.1.1$^{3,6}$.0$^{9,14}$]hexadecane,
5,13-bis(3,4-epoxycyclohexylmethoxy)pentacyclo
[9.2.2.1$^{3,9}$.0$^{4,8}$]hexadecane,
3-methyl-6,13-bis(2,3-epoxypropoxy)pentacyclo
[9.2.1.1$^{5,8}$.0$^{2,10}$.0$^{4,9}$]pentadecane,
3,6,14-tris(2,3-epoxypropoxy)pentacyclo
[10.2.1.1$^{5,8}$.0$^{2,11}$.0$^{4,9}$]hexadecane,
4,12-bis(2,3-epoxypropoxy)hexacyclo[6.6.1.1$^{3,6}$.0$^{10,13}$]
heptadecane, and the like.

The novel polyepoxy monomers of this invention may be conveniently prepared by epoxidation of the corresponding polyolefinic precursors. These precursors may be prepared by the reaction of the appropriate polycarbocyclic diene, triene or tetraene with an unsaturated organic acid or alcohol in the presence of an acid catalyst. The preparation is effected preferably by mixing the acid or alcohol with the catalyst and then heating the mixture to the reaction temperature in the range of from about 70° C. to about 150° C. The polyunsaturated polycarbocyclic compound is then added to the mixture as rapidly as possible. Since some polyunsaturated homocarbocyclic compounds, e.g., bicycloheptadiene, will polymerize in the presence of an acid catalyst, they are added to the mixture of catalyst and acid or alcohol in order to minimize homopolymerization, and to encourage the desired addition reaction to predominate. The reaction mixture is maintained at a temperature sufficient to maintain reflux conditions, i.e., about 70° C. to about 220° C., until the reaction is complete. Reaction time will normally be from about 2 to 10 hours. Periodic analysis of the reaction mixture may be made until the desired conversion is achieved.

In the particular instance where bicyclo[2.2.1]heptadiene is employed as the polyunsaturated polycarbocyclic compound, the reaction product mixture will consist primarily of 3 addition products, as illustrated below by the exemplary reaction of bicyclo[2.2.1]hepta-2,5-diene and acrylic acid. The reaction product will comprise the desired disubstituted diunsaturated product (III) as well as the corresponding bicycloheptene monosubstituted product (I) and the monosubstituted nortricyclene derivative (II).

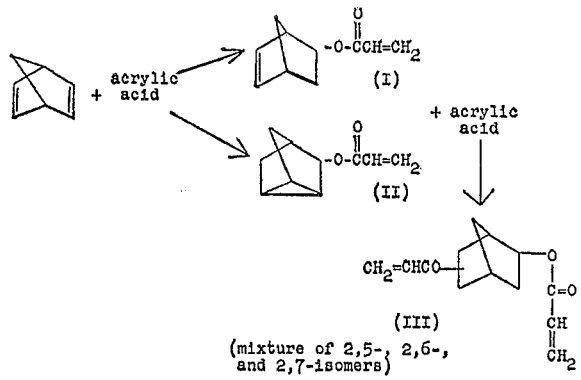

(mixture of 2,5-, 2,6-, and 2,7-isomers)

The products may be separated by distillation at reduced pressure. If desired, the overall conversion to the disubstituted compound (III) may be increased by further reaction of the monosubstituted product (I) and the monosubstituted nortricyclyl product (II), with an unsaturated acid or alcohol as known before. This method may also be employed to prepare bicycloheptylene compounds having different olefinically unsaturated substituents by reacting the monosubstituted products (I and II) of a past reaction with a different unsaturated acid or glycol to obtain a disubstituted product having different olefinic substituents. The reaction has been found to proceed as above depicted in that the disubstituted product obtained consists primarily of the 2,5- and 2,6-disubstituted bicycloheptylene isomers. Actually the reaction product mixture comprises a mixture of the 2,5-, 2,6- and 2,7-isomers, the latter being present in least amount. Both exo and endo forms are present.

The acid catalyst employed may be either a Lewis acid or a proton acid. Suitable catalysts include such compounds as boron trifluoride, sulfuric acid, perchloric acid, and the like. The hydrogen halides are not usually employed since they tend to add to the unsaturated system. The acid is preferably employed in amounts ranging from about 0.1 to about as high 10 percent by weight, usually from about 1 to 5 percent by weight of catalyst is employed.

In carrying out the above reaction, the unsaturated active hydrogen containing compound, i.e., the unsaturated acid or alcohol should be in molar ratio of at least about 2 to 1 with respect to the polyunsaturated polycarbocycle employed. It is preferred that a larger excess of about 5 to 1 to as high as 10 to 1 be used.

Epoxidation of the polyunsaturated precursors so prepared is most easily effected by means of an organic peracid. Among the peracids contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to about 50 weight percent of peracid, based on the total weight of peracid and inert organic vehicle is suitable; from about 20 to 40 weight percent of peracid is preferred. The epoxidation reaction can be conducted at a temperature in the range of from about 0° C., and lower, to about 100° C., and higher, and preferably from about 25° C. to about 75° C. It is highly desirable to employ an excess of the stoichiometric quantity of peracid (per carbon to carbon double bond of the polyolefinic precursor) in order to effect or favor substantial diepoxidation of said precursor. For instance, from about 2.2 to about 10, and higher, mols of peracid per mol of polyolefinic precursor can be employed with advantageous results, though lower and higher ratios of peracid to precursor can be used, if desired. The epoxidation reaction is conducted for a period of time sufficient to introduce oxirane oxygen at the site of the carbon to carbon double bonds present in the polyolefinic precursor, e.g., from several minutes to several hours. Periodic analysis of samples of the reaction mixture to determine the quantity of peracid consumed during the epoxidation reaction can be readily performed by the operator by well-known techniques. At the termination of the epoxidation reaction, the unreacted polyolefinic precursor, acid by-product, unspent peracid, inert vehicle, if employed, and the like, can be recovered from the reaction product mixture, for example, by distillation under reduced pressure. Further well-known purification techniques can be employed, as desired.

The polyolefinic precursors may also be prepared by reaction of a polyhydroxy substituted hydrocarbon having a ring structure as hereinbefore discussed with an unsaturated aliphatic halide, e.g. allyl chloride under basic conditions to produce the polyunsaturated precursor. For example, tetracyclo[6.2.1.1$^{3,6}$.0$^{2,7}$]dodeca-4,9-diol and allyl chloride in the presence of NaOH will react as follows:

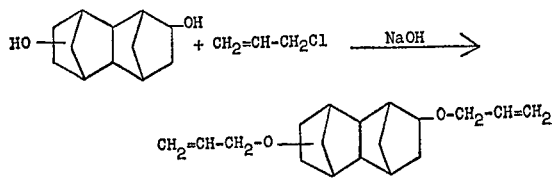

The diallylic precursor may then be epoxidized as above to produce the corresponding diepoxide.

A further preparative method for the epoxides of this invention involves the reaction of a polyhydroxy substituted hydrocarbon having a ring structure as hereinbefore discussed with an epihalohydrin, such as epichlorohydrin, in the presence of a condensation catalyst to form the halohydrin ether, and subsequently dehydrochlorinating the product with an alkaline material to obtain the epoxy ether. For example, tricyclo[5.2.1.0$^{2,6}$]decan-4,9-diol and epichlorohydrin will react in the presence of an acidic-type condensation catalyst such as HF, $H_2SO_4$, $H_3PO_4$, $SnCl_4$ or $Bf_3$ ether complexes to form the hydroxy halogen product which is then dehydrochlorinated to the diepoxide in the presence of an alkaline material such as sodium hydroxide, potassium hydroxide, sodium and potassium carbonates and bicarbonates or the hydroxides of magnesium, zinc lead, iron and aluminum, and the like C. and higher, for a period of time sufficient to produce said homopolymeric products.

The acidic and basic catalysts which can be employed in the polymerization reaction include, for example, the metal halide Lewis acids, e.g., boron trifluoride, aluminum chloride, zinc chloride, stannic chloric, ferric chloride, boron trifluoride-piperidine complex, boron trifluoride-1,6-hexanediamine complex, boron trifluoride-monoethylamine complex, boron trifluoride-dimethyl ether complex, boron trifluoride-diethyl ether complex, boron trifluoride-dipropyl ether complex, and the like; the strong mineral acids, e.g., sulfuric acid, phosphoric acid, polyphosphoric acid, perchloric acid, and the like; the saturated aliphatic hydrocarbon sulfonic acids and the aromatic hydrocarbon sulfonic acids, e.g., ethanesulfonic acid, propane-sulfonic acid, benzenesulfonic acid, toluenesulfonic acid, naphthalenesulfonic acid, lower alkyl substituted-benzenesulfonic acid, and the like; the alkali metal hydroxides, e.g., sodium hydroxide, potassium hydroxide, and the like; the tertiary amines, e.g., alpha-methylbenzyldimethylamine, dimethylethylamine, triethylamine, tripropylamine, trimethylammonium hydroxide, and the like.

Catalyst concentrations and polymerization temperatures are believed to affect the polymerization rate, the higher concentrations and temperatures promoting faster reaction rates than the lower ones. The catalyst concentration can be varied over a broad range and can be selected

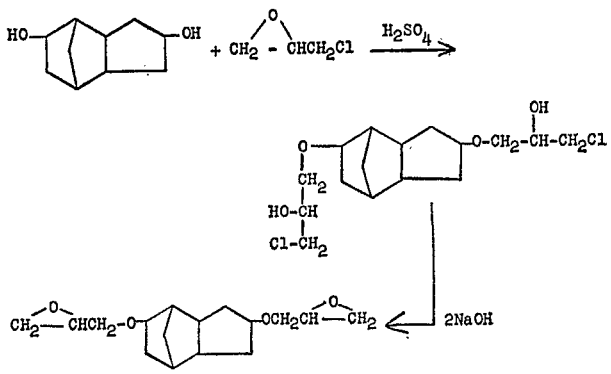

In the latter reaction at least one mole of hydroxide should be employed for each halohydrin group to be dehydrohalogenated. The acid catalyst used to effect the first step of the above reaction is employed in small catalytic amounts varying from less than 1 percent to about 5 percent by weight based upon the reactants.

The preparative methods discussed above may also be applied to the production of epoxides from methanols having a ring structure as hereinbefore provided. Polyhydroxy compounds such as 2,5-dihydroxymethyl bicyclo-[2.2.1]heptane are prepared by hydration of the dialdehyde obtained in the hydroformylation of bicyclo[2.2.1]hepta-2,5-diene with carbon monoxide and hydrogen in the presence of a carbonylation catalyst. Thus, the well known oxo process may be employed to produce polycarbocyclic methanols which may be reacted according to the methods above to obtain the diolefinic precursors and alternately novel diepoxides within this invention. It is deemed within the purview of the instant invention and it will be obvious to those skilled in the art to combine the preparative procedures above to produce various polyepoxides having various epoxide groups bonded to the polycarbocyclic ring structure in various ways.

The novel polyepoxy ethers and carboxylates of this invention may be homopolymerized and copolymerized to form novel compositions ranging in character from thick viscous liquids to hard tough resins. These novel homopolymers are prepared by contacting the polyepoxy ethers and carboxylates of this invention with an acidic or basic catalyst, described hereinafter, at a temperature in the range of from about 25° C. and lower to about 250° on the basis of the rate of polymerization desired and the polymerization temperature to be used. It has been observed that a catalyst concentration in the range of from about 0.005 to 15 weight percent, preferably from about 0.01 to 5 weight percent, based on the weight of the diepoxide, is advantageous in forming useful polymeric products.

In another aspect, the invention is directed to novel curable, polymerizable compositions comprising a novel polycarbocyclylene polyepoxide of this invention and an active organic hardener, and to the partially cured (fusible thermosetting intermediate reaction products) and cured resins resulting therefrom. The active organic hardeners illustrated hereinafter are employed in a curing amount that is, an amount which is sufficient to cause the curable system comprising the novel polyepoxide or a mixture of the novel polyepoxides to become a thermosetting or thermoset copolymeric resin in accordance with the teachings of the instant specification. Representative active organic hardeners include polycarboxylic acids, polycarboxy polyesters, polycarboxylic acid anhydrides, polyols, e.g., polyhydric phenols, polyhydric alcohols, and polyhydric polyesters, polyfunctional amines, polythiols, polyisocyanates, polyisothiocyanates, polyacyl halides, and the like. The novel curable compositions can contain one active organic hardener or a mixture of active organic hardeners.

The novel polyepoxy ethers and carboxylates of this invention result in resins having distinct and multifold advantages, as previously pointed out in that they are curable at room temperature, yet yield resins which possess high heat distortion temperatures, and which are not adversely affected by ultraviolet light. This unique combination of properties makes the novel polyepoxides highly desirable in a multitude of resin applications. Heretofore, room temperature curable polyepoxy monomers were polyglycidyl polyethers or of linear diepoxides which resins suffered in the first instance from ultraviolet light degradations, and in the second instance from low heat distortion temperatures.

The curable compositions of the invention can be prepared by mixing the above novel polyepoxides with the active organic hardener(s), preferably under agitation, so as to obtain a homogeneous mixture. The order of addition of the components does not appear to be critical. Heating is advantageous in facilitating the formation of a solution. The application of heat should not be prolonged to the extent that appreciable curing takes place.

The curable compositions of the invention can be partially cured or fully cured by maintaining the temperature in the range of from about 25° C., and lower, to about 250° C., and higher, and preferably from about 25° to about 200° C. A higher curing temperature generally will provide a thermosetting or thermoset resin in less time than a lower curing temperature. One preferable method is to heat the curable compositions to a temperature within the range from about 50° C. to 150° C. to first partially cure the composition. A temperature from about 100° C. to 200° C. then can be used to complete the cure. However, any one or combination of two or more temperatures within the specified range of 25° C. to 250° C. can be employed, if desired, to effect the full cure. For casting purposes, the preferred minimum temperature of the normally-solid curable compositions is that at which said compositions form a uniform melt, whereas for coatings and the preparation of laminates, the use of solvents will allow the use of lower temperatures.

The time for effecting the partial cure or the complete cure will be governed, to an extent, on several factors such as the particular active organic hardener(s) employed, the proportions of polyepoxide and active organic hardener(s), the inclusion of an active organic hardener modifier, the inclusion of a catalyst, the concentration of the catalyst and/or modifier, the temperature for effecting the cure and other considerations. In general, the time for effecting the complete cure can vary from several minutes to several days, e.g., from 10 minutes to 24 hours, depending upon the correlation of such factors as illustrated above.

If desired, basic or acidic catalysts such as those illustrated previously can be incorporated into the curable compositions of the invention to increase the cure rate and/or reduce the gelation period. It is generally suitable to add the catalyst to the curable composition which is maintained at a temperature in the range of from about 10° C. to 100° C. Agitation of the curable composition prior to, during, and after the incorporation of the catalyst is desirable to ensure a homogeneous mixture. Catalyst concentrations of the order described previously can be employed.

In one preferred embodiment, the invention is directed to novel curable, partially cured, and cured compositions comprising the above novel polyepoxides and a polycarboxylic acid in such relative amounts so as to provide from about 0.1 to about 2.0 carboxy groups i.e., —COOH groups, of said polycarboxylic acid per epoxy group, i.e.,

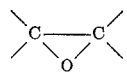

group, of the diepoxide, and preferably from about 0.3 to about 1.2 carboxy groups per epoxy group.

Representative polycarboxylic acids which can be employed include, for example, oxalic acid, malonic acid, succinic acid, glutaric acid, adipic acid, pimelic acid, suberic acid, azelaic acid, sebacic acid, alkylsuccinic acids, alkenylsuccinic acids, maleic acid, fumaric acid, itaconic acid, citraconic acid, mesaconic acid, glutaconic acid, isopropylidenemalonic acid, allylmalonic acid, muconic acid, alpha-hydromuconic beta-hydromuconic acid, diglycolic acid, dilactic acid, thiodiglycolic acid, 4-amyl-2,5-heptadienedioic acid, 3-hexynedioic acid, 1,2-cyclohexanedicarboxylic acid, 1,4-cyclohexanedicarboxylic acid, phthalic acid, isophthalic acid, terephthalic acid, tetrahydrophthalic acid, tetrachlorophthalic acid, 1,8-naphthalenedicarboxylic acid, 3-carboxycinnamic acid, 1,2-naphthalenedicarboxylic acid, 1,1,5-pentanetricarboxylic acid, 1,2,4-hexanetricarboxylic acid, 2-propyl-1,2,5-pentanetricaboxylic acid, 1,2,3-propanetricarboxylic acid, 1,2,4-benzenetricarboxylic acid, 1,3,5-benzenetricarboxylic acid, 3-hexene-2,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, and the like. Copolymers of acrylic acid and an olefinically unsaturated monomer such as butadiene, styrene, ethyl acrylate, vinyl halide, and the like also can be employed. In addition, the dimerized and trimerized unsaturated fatty acids, of, for example, linoleic acid, oleic acid, linolenic acid, undecylenic acid, and the like are useful. Other useful polycarboxylic acids, which can be employed may be prepared from bicyclo[2.2.1]hepta-2,5-diene or a similar polycarbocyclic diene, triene, etc., and a polycarboxylic acid in a manner similar to the preparative method employed to produce the diolefinic precursors of the novel diepoxides of this invention. Thus by reaction of such dicarboxylic acids as fumaric acid, maleic acid, oxalic acid, phthalic acid, succinic acid or the like, with a diene such as bicyclo[2.2.1]-hepta-2,5-diene in the presence of an acid catalyst as previously provided, there is provided another class of polycarboxylic acids useful as curing agents in the novel compositions of this invention. The bicycloheptylene or like polycarbocyclylene polycarboxylic acids can be alternatively prepared by reaction of the polyol corresponding to the polycarbocyclic diene, triene, etc., bicyclo[2.2.1]-heptane-2,5(6)-diol with the corresponding dicarboxylic acid anhydride. The hardeners which may be produced in this manner include bicyclo[2.2.1]hept-2,5-ylene dimaleate, bicyclo[2.2.1]hept-2,6-ylene difumarate, bicyclo-[2.2.1]hept-2,6-ylene disuccinate, tricyclo[5.2.1.0$^{2,6}$]dec-3,8-ylene dimaleate, tetracyclo[6.2.1.1$^{3,6}$.0$^{2,7}$]dodec-4,10-ylene disuccinate and the like. Polycarboxylic acids having melting points below 250° C. are desirable.

In a second preferred embodiment, the invention is directed to novel curable, partially cured, and cured compositions comprising the above novel polyepoxides of this invention and a polycarboxylic acid anhydride in such relative amounts so as to provide from about 0.1 to about 4.0 carboxy groups of the polycarboxylic acid anhydride per epoxy group of the polyepoxide, and preferably from about 0.8 to about 2.5 carboxy groups per epoxy group. It should be noted that by the expression "carboxy groups of the polycarboxylic acid anhydride" is meant the carboxy groups which would be contained by the corresponding polycarboxylic acid. For example, succinic anhydride does not possess any carboxy groups per se; however, the corresponding polycarboxylic acid is succinic acid which contains two free carboxy groups. Thus, succinic anhydride has two carboxy groups as applied in the above expression. In different language, by the expression "carboxy groups of polycarboxylic acid anhydride" is meant the carboxy groups contained in the "hydrated" polycarboxylic acid anhydride.

Illustrative polycarboxylic acid anhydrides include the aliphatic, aromatic, and cycloaliphatic acid anhydrides. The preferred anhydrides are the dicarboxylic acid anhydrides, and preferably the hydrocarbon dicarboxylic acid anhydrides which include, for example, phthalic anhydride, tetrahydrophthalic anhydride, hexahydrophthalic anhydride, chlorendic anhydride, maleic anhydride, chloromaleic anhydride, dichloromaleic anhydride, citraconic anhydride, isocitraconic anhydride, glutaric anhydride, adipic anhydride, succinic anhydride, itaconic anhydride, heptylsuccinic anhydride, hexylsuccinic anhydride, methylbutylsuccinic anhydride, methyltetrahydrophthalic anhydride, n-nonenylsuccinic anhydride, octenylsuccinic anhydride, pentenylsuccinic anhydride, propylsuccinic anhydride, 4-nitrophthalic anhydride, 1,2-naphthalic anhydride, 2,3-naphthalic anhydride, 1,8-naphthalic anhydride, tetrabromophthalic anhydride, tetraiodophthalic anhydride, and the like. Polycarboxylic acid anhydrides which have melting points below about 250° C. are desirable.

In a third preferred embodiment, the invention is directed to novel curable, partially cured, and cured compositions comprising the above novel polyepoxides and a polyol in such relative amounts so as to provide from about 1.0 to about 2.0 hydroxy groups, i.e., —OH groups, of said polyol per epoxy group of the polyepoxide, and preferably from about 0.2 to about 1.0 hydroxy group per epoxy group. By the term "polyol," as used herein including the appended claims, is meant an organic compound having at least two hydroxyl groups, which are alcoholic hydroxy groups, phenolic hydroxy groups, or both alcoholic and phenolic hydroxy groups. The term "polyol" preferably encompasses the polyhydric alcohols and the polyhydric phenols.

Illustrative of the polyols contemplated include, for example, the aliphatic and cycloaliphatic polyhydric alcohols, e.g., ethylene glycol, diethylene glycol, the poyethylene glycols, propylene glycol, the polypropylene glycols, the polyethylenepolypropylene glycols, trimethylene glycol, the butanediols, 2-butene-1,4-diol, the pentanediols, the pentenediols, 2-ethyl-1,3-hexanediol, the hexenediols, 2-methoxy - 2,4 - dimethyl-1,5-pentanediol, 12,13-tetracosanediol, polyglycerol, 1,1,1-trimethylolpropane, pentaerythritol, sorbitol, the polyvinyl alcohols, the octenediols, the cyclopentanediols, the cyclohexanediols, the lower alkyl substituted-cyclohexanediols, inositol, trimethylolbenzene; and the polyhydric phenols, e.g., resorcinol, catechol, pyrogallol, hydroquinone, the dihydroxytoluenes, dihydroxyxylene, bis(4-hydroxyphenyl)-2,2-propane, bis (4 - hydroxyphenyl) - methane, 1,9 - naphthalenediol, the polyhydric phenol-formaldehyde condensation products, and the like. The alkylene oxide adducts, e.g., ethylene oxide, propylene oxide, etc., of polyhydric alcohols or polyhydric phenols such as those illustrated above also are highly suitable.

Another useful class of polyhydric alcohols which are suitable may be prepared by reacting bicyclo[2.2.1]hepta-2,5-diene or a similar polycarbocyclic diene and a glycol such as those mentioned above as useful as curing agents themselves. Thus a class of polyols suitable as curing agents may be prepared by the reaction of bicyclo[2.2.1]-hepta-2,5-diene tricyclo[5.2.1.0$^{2,6}$]deca-3,8-diene or the like and a polyol such as ethylene glycol, diethylene glycol, hexanediol, cyclohexanediol and the like in the presence of an acid catalyst in a manner similar to the employed to prepare the diolefinic precursors of the novel diepoxides of this invention. Illustrative of the polyol hardeners within this class are bicyclo[2.2.1]hept-2,5-ylene bis(2-hydroxyethyl ether), bicyclo[2.2.1]hept-2,6-ylene bis(6-hydroxyhexyl ether), bicyclo[2.2.1]hept-2,5-ylene bis(3-hydroxycyclohexyl ether), tricyclo[5.2.1.0$^{2,6}$]dec - 2,8 - ylene bis(2-hydroxyethyl ether) and the like. Polyols having melting points below 250° C. are desirable.

A fourth preferred embodiment of the invention is directed to novel curable, partially cured, and cured compositions comprising the novel polyepoxides above and a polycarboxy polyester in such relative amounts so as to provide from about 0.1 to about 2.0 carboxy groups of said polycarboxy polyester per epoxy group of the diepoxides, and preferably from about 0.3 to about 1.2 carboxy groups per epoxy group. By the term "polycarboxy polyester," as used herein including the appended claims, is meant a polyester which contains at least two carboxy groups in the average molecule. The polycarboxy polyesters can be prepared by known condensation procedures, employing mol ratios favoring greater than equivalent amounts of polycarboxylic acid or polycarboxylic acid anhydrides with relation to the polyhydric alcohol. More specifically, the amount of polycarboxylic acid or polycarboxylic acid anhydride which is employed in the esterification reaction should contain more carboxy groups, collectively, than are required to react with the hydroxy groups contained in the amount of polyhydric alcohol so that the resulting esterified product, i.e., polycarboxy polyester, contains at least two free carboxy groups in the average polycarboxy polyester molecule. The polycarboxylic acids, polycarboxylic acid anhydrides, and polyols which can be employed in the preparation of the polycarboxy polyesters have been illustrated previously. The polycarboxy polyesters can be obtained by condensing, in accordance with known procedures, a polyhydric alcohol and a polycarboxylic acid or a polycarboxylic acid anhydride. This condensation reaction may be conducted, for example, by heating the reactants to a temperature within the range from 100° C. to 200° C., with or without an acidic catalyst. Water formed by the condensation reaction may be removed by distillation. The course of the reaction may be followed by making acid number determinations and the reaction can be stopped when a suitable polycarboxy polyester has been obtained.

The invention also contemplates the modification of the properties and characteristics of the partially cured and fully cured compositions (resins) set forth previously in the discussion of the four preferred embodiments. Special and highly desirable effects can be imparted to the partially cured and fully cured compositions by incorporating a second active organic hardener (hereinafter termed "modifier") into the curable composition comprising the epoxide monomer and "major" active organic hardener (i.e., polycarboxylic acid, polycarboxylic acid anhydride, polyol, polycarboxy polyester, and the like). The proportions of modifier to "major" active organic hardener are such that the number of reactive groups contained by an amount of the modifier with relation to the number of reactive groups contained by an amount of the "major" active organic hardener will be in a ratio that is less than one. It is to be understood that the term "reactive groups" pertains to groups which are reactive with the epoxy groups contained in the monomeric polyepoxide. For instance, to a curable composition comprising an epoxide of this invention and a polycarboxylic acid, there can be added an amount of a modifier, e.g., polycarboxylic acid anhydride, polycarboxy polyester, polyol, etc., such that the ratio of reactive groups contained by the modifier with respect to the carboxy groups contained by the polycarboxylic acid is less than one. On this basis the modifier can be considered to be the minor component in relation to the polycarboxylic acid. As a second illustration, if the curable composition comprises a novel polyepoxide of this invention and a polyol, an amount of modifier, e.g., polycarboxylic acid, polycarboxy polyester, polycarboxylic acid anhydride, polyisocyanate, polythio, etc., can be added to said curable mixture such that the ratio of the reactive groups contained by the modifier with respect to the hydroxy groups contained by the polyol is less than one. Again it will be noted that the modifier is the minor component with respect to the polyol. The modifiers which can be employed are those illustrated previously in the discussion of polycarboxylic acids, polycarboxylic acid anhydrides, polyols, polycarboxy polyesters, etc.

A fifth preferred embodiment is directed to curable, partially cured, and cured compositions comprising a novel polyepoxide according to this invention and a polyfunctional amine in such relative amounts so as to provide from about 0.2 to about 5.0 amino hydrogen atoms of said polyfunctional amine per epoxy group of the diepoxide, and preferably from about 0.8 to about 2.0 amino hydrogen atoms per epoxy group. By the term "polyfunctional amine," as used herein including the appended claims, is meant an organic amine having at least two active amino hydrogen atoms which can be on the same nitrogen atom or on different nitrogen atoms.

The amine-cured resins of this embodiment provide extremely useful compositions in view of their room temperature curability. In addition, the optical properties of the amine cured resins of this embodiment offer excellent optical properties. Resins prepared from the novel epoxides of this invention are water white and are ideally suited for use in laminating resins in safety glass, television tubes and the like. Moreover the singular ability of the novel compositions to resist discoloration and degradation when exposed to ultraviolet light renders these resins extremely useful in this application.

Among the polyfunctional amine subclasses contemplated include the aliphatic amines, aromatic amines, aralkyl amine, cycloaliphatic amine, alkaryl amines, aliphatic polyamines including polyalkylene polyamines, amino-substituted monohydric and polyhydric aliphatic alcohols and phenols, polyamides, addition products of polyamines and low molecular weight epoxides containing oxirane oxygen linked to vicinal carbon atoms, and others.

The thermoset cured resins of the invention vary from soft and flexible to hard and rigid products, depending upon the proportion, the functionality, and the chain length of the active organic hardener employed. These resins are insoluble in many of the common organic solvents. The hard, infusible, rigid thermoset resins can be machined to desired shapes and configurations, and they can be polished to provide appealing finishes. The novel compositions, as indicated throughout the specification, are highly useful and valuable in fields such as the coatings, laminating, molding encapsulation, etc., arts.

A sixth highly preferred embodiment is directed to curable, partially cured, and cured compositions comprising the above novel polyepoxides, a polycarboxylic acid anhydride which contains a polymerizable double bond, and an active olefinically unsaturated organic monomer. To the curable mixture, there can be added a fourth component, that is, a polyol such as those previously described. The polyol can contain olefinic unsaturation or it can be fully saturated. However, should the polyol contain olefinic unsaturation, then the polycarboxylic acid anhydride component can be fully saturated, if desired. Thus, in the four component system both the polycarboxylic acid anhydride and the polyol components can contain olefinic unsaturation, or either component can contain olefinic unsaturation. The three and four component curable systems have been found to possess several highly desirable and unexpected advantages. The preferred systems cure very readily and gelation is oftentimes manifest at room temperature. Many of the resulting cured resins exhibit high and efficient thermal stability at elevated temperatures by virtue of including the active olefinically unsaturated organic monomer in the curable compositions. The inclusion of the active olefinically unsaturated organic monomer to the curable system also results in the lowering of the melt temperature, and in the reduction of the viscosity of the system as compared to the corresponding curable system lacking same. The saturated and unsaturated polycarboxylic acid anhydrides and polyols have been illustrated previously. Maleic anhydride is highly preferred as the polycarboxylic acid anhydride component. It is desirable that the relative proportions of monomeric diepoxide, polycarboxylic acid anhydride, and active olefinically unsaturated organic monomer, with or without the polyol component (preferably polyhydric alcohol compound), comprising the curable compositions are such as to provide from about 0.2 to about 5.0 (preferably from about 0.4 to about 2.0) carboxy groups of anhydride per epoxy group of monomeric diepoxide, and from 0.01 to about 2.0 (preferably from about 0.05 to about 1.0) hydroxy groups of polyol per epoxy group of monomeric diepoxide. The quantity of active olefinically unsaturated organic monomer is most conveniently based on a ratio of ethylenic groups of said monomer per ethylenic groups of polycarboxylic acid anhydride and/or polyol. Thus, it is desirable to employ the polycarboxylic acid anhydride, polyol, and active olefinically unsaturated organic monomer in amounts so as to provide from about 0.002 to about 5.0, preferably from about 0.2 to about 2.0, ethylenic groups of active olefinically unsaturated organic monomer per ethylenic group of polycarboxylic acid anhydride and/or polyol. It should be noted that the term "ethylenic group" refers to the

group. Illustrative active olefinically unsaturated monomers include the mono- and polyolefinic hydrocarbons, e.g., the heptanes, the nonenes, hexadiene, cyclopentene, cyclohexene, lower alkyl substituted-cyclohexene, styrene, divinylbenzene, and the like; the olefinic esters, ethers, and acids, e.g., divinyl ether, diallyl ether, di(2-butenyl) ether, methyl methacrylate, propyl acrylate, methyl acrylate, ethyl acrylate, methyl crotonate, allyl crotonate, crotonic acid, cinnamic acid, acrylic acid diallyl phthalate, 2-pentenoic acid, and the like. Styrene is highly preferred.

The use of catalysts in the novel curable compositions described in the sixth embodiment is optional. Acidic and basic catalysts such as those described previously can be employed, if desired, to increase the rate of reaction between the polycarboxylic acid anhydride and the polyepoxide. In certain instances, it may be desirable to catalyze the reaction or polymerization of the polycarboxylic acid anhydride and the active olefinically unsaturated organic monomer. Among such latter catalysts are, by way of illustration, benzoyl peroxide, t-butyl hydroperoxide, cumene hydroperoxide, acetyl peroxide, p-menthane hydroperoxide, lauroyl peroxide, di-t-butyl peroxide, t-butyl perbenzoate, and the like.

A seventh preferred embodiment is directed to curable and partially cured compositions (fusible thermosetting intermediate reaction products that are viscous liquids or solids) comprising the novel aforesaid polyepoxides according to this invention, and inactive organic hardener, with or without a modifier, said compositions being dissolved in an inert normally-liquid organic medium such as xylene, methyl isobutyl ketone, butyl acetate, ethyl acetate, toluene, amyl acetate, and the like. The compositions dissolved in the above examplary list of organic media can be used, as for example, surface coating which can be subsequently heat cured to hard, tough, scratch-resistant coatings.

The proportion of partially cured resin, i.e., fusible thermosetting intermediate reaction products, to organic media will depend on various factors such as the particular mixture being cured, the degree or extent of the partial cured, the particular organic medium employed, and other considerations. In general, a solution comprising from about 10 to about 90 weight percent of the partially cured resin, based on the total weight of partially cured resin and organic medium is suitable; from about 40 to 70 weight percent of partially cured resin, based on the total weight of partially cured resin and organic medium, is preferred. Moreover, the uncured compositions can be dissolved in the organic media exemplified above and applied to surfaces and subsequently heat cured to form hard, tough coatings. Should the solution comprising the uncured composition or partially cured composition tend to "run" when applied to the surface, a conventional wetting agent and/or thixotropic agent can be added to the solution mixture to ensure a more uniform coating on the surface.

In another preferred embodiment, the invention is direction to the preparation of valuable varnishes which are obtained by the reaction of the above novel polyepoxides with aliphatic monocarboxylic acids, at elevated temperatures, e.g., from about 100° C. to about 200° C., for a period of time ranging from about 0.5 to 10 hours, and longer, followed by homopolymerizing the resulting reaction product (which contains residual or free expoxy and hydroxy groups) with a catalyst such as those described previously, preferably at a temperature in the range of from about 25° C. to 250° C., to thus produce high molecular weight polymeric products commonly known to the art as varnishes. The amounts of aliphatic monocarboxylic acid and polyepoxide monomer employed are such so as to provide from about 0.3 to about 0.7 carboxy group of monocarboxylic acid per epoxy group of diepoxide. The unsaturated aliphatic monocarboxylic acids are preferred. Illustrative acids include hexanoic acid, caprylic acid, lauric acid, capric acid, myristic acid, oleic acid, linoleic acid, stearic acid, licanic acid, recinolic acid, hexenoic acid, hexadienoic acid, octenoic acid, and the like. Acids derived from natural sources such as castor oil, dehydrated castor oil, coconut oil, cottonseed oil, oiticaca oil, perilla oil, olive oil, safflower oil, sardine oil, soyabean oil, tall oil, tung oil, and the like, are advantageous to employ both from an economy standpoint and since highly useful varnishes result from the process. If desired, the reaction between the polyepoxide monomer and the aliphatic monocarboxylic acid can be effected in the presence of an acidic or basic catalyst such as those described previously, and also, the reaction can be conducted in the presence of an inert normally-liquid organic medium. Suitable media include, for instance, the aromatic hydrocarbons, e.g., benzene, toluene, xylene, ethylbenzene, and the like; the saturated aliphatic and cycloaliphatic hydrocarbons, e.g., hexane, heptane, cyclopentane, cyclohexane, lower alkyl substituted-cyclohexane, and the like; the oxygenated organic compounds, e.g., ethyl acetate, butyl acetate, amyl acetate, acetone, methyl ethyl ketone, methyl isobutyl ketone, cyclohexanone, tetrahydrofuran, dioxane, diisopropyl ether, and the like. The homopolymerization of the reaction product which contains residual or free epoxy and hydroxy groups can also be effected, if desired, in the presence of an inert normally-liquid organic medium such as those illustrated supra. The progress of the homopolymerization reaction can be observed by determining the relative viscosity of samples drawn from the reaction mixture. In this manner, it is possible to produce partially polymerized compositions or essentially complete polymerized compositions.

The polymerized compositions of the last mentioned preferred embodiment generally are obtained as solid-like products. These polymerized compositions can be classified as drying compositions or non-drying compositions. The former are those which contain ethylenic unsaturation whereas the latter are saturated compositions. Both the drying and non-drying compositions are useful as modifiers for coating resins such as phenol-formaldehyde resins, melamine-formaldehyde resins, alkyd resins, and the like. These compositions are outstanding as modifiers because they have a wide range of compatibility, they impart improved caustic, water, and chemical resistance to the resin coatings they are modifying, and they impart improved flexibility and toughness. The drying compositions are capable of "drying" or curing to excellent protective coatings, with or without the application of heat. It is generally desirable to employ various metallic salts of organic compounds known to the art as "driers" to accelerate the drying process. The drying can be accomplished at temperatures in the range of from about 10° C. to about 250° C. and for a period of time sufficient to produce the desired property in the resin. The concentration of the drier compound can range from about 0.001 to about 5.0 weight percent, and higher, based on the weight of the drying compound (polymer). Suitable driers include soluble compounds containing heavy metals, e.g., cobalt, lead, manganese, calcium, zinc, iron, and the like. Examples of such driers include cobalt naphthenate, lead octanoate, and the like. The drying compositions can be treated in the various ways familiar to the varnish and paint industries to produce special or advantageous effects.

In a still further preferred embodiment, valuable varnish compositions can be obtained by the reaction of the above novel polyepoxides with polyol(s), preferably diol(s), at a temperature in the range of from about 25° C. to about 250° C., for a period of time ranging from about 0.5 to 10.0 hours, and longer, followed by partial or essentially complete esterification of the fusible, polymeric polyhydric product with an aliphatic monocarboxylic acid, preferably at elevated temperatures, to produce high molecular weight polymeric products (varnishes) which may contain residual or free hydroxy groups. The proportions of polyol and polyepoxide monomer employed are such so as to provide from about 0.5 to about 1.5 hydroxy groups of polyol per epoxy group of monomeric diepoxide. The polyols and aliphatic monocarboxylic acids which can be employed have been illustrated previously. The use of catalysts and solvents, if desired, has also been discussed supra.

In a yet further preferred embodiment, the novel polyepoxides of the invention can be applied to cellulosic and cellulosic-containing textile fabric in the form of an aqueous system or dissolved in an inert, normally-liquid organic solvent which is miscible with water, and subsequently cured within the fibers of said fabric. The cure step can be accelerated by means of acidic catalysts such as the fluoborates of magnesium, tin, cadmium, sodium, zinc, and the like. Also, the acidic catalysts described previously can be employed. The concentration range of the acidic catalyst is of the magnitude set forth previously. In general, it is desirable to immerse the fabric in an aqueous system which contains from about 1 to about 30, preferably from about 3 to about 20, weight percent of the novel diepoxide, and thereafter pass the "wet" fabric through a squeeze roller. One or more immersions (and squeezings) can be employed, if desired. The aqueous system, also, can contain plasticizers, natural resins, textile softening agents, etc., which are well known to the art. Excess water is removed from the fabric by air-drying, or preferably at a temperature of from about 35° C. to 80° C. for a few minutes, e.g., 1 to 5 minutes, or longer. Neither the drying time nor the temperature range is narrowly critical. The main purpose is to remove excess water, and as such, this step is readily accomplished by those skilled in the art. Thereafter, the fabric can be "cured" at a temperature which is sufficient to promote the reaction of the diepoxide with the fibrous material being treated. A wide "cure" temperature can be employed, e.g., from about 120° C., and lower, to about 200° C., and higher, and the time can range from several seconds to 15 minutes, and longer. After this step, it is highly desirably to scour the fabric to remove unreacted diepoxide and acidic catalyst therefrom. The resulting treated fabric exhibits increased shrink and crease resistance and a soft smooth finish after laundering (without the necessity of ironing said fabric).

In certain of the following illustrative examples, the Barcol hardness values were determined by the use of Barcol Impressor GYZJ-934-1 at a temperature of approximately 25° C. The curable systems, when necessary, were heated gently until homogeneity occurred, followed by quickly cooling the resulting solution to room temperature, i.e., about 25° C.

The following examples are illustrative.

Example I.—2,5(6)-bis(allyloxy)bicyclo[2.2.1]heptene

To a mixture of 1160 grams of allyl alcohol (20 moles) and 20.8 grams of boron trifluoride, heated to 75° C., was added 920 grams of bicyclo[2.2.1]hepta-2,5-diene. Heating of the mixture under reflux was continued for 11 hours. The catalyst was neutralized with 70 grams of anhydrous sodium acetate. Distillation was carried out in a 1 inch x 72 inch fractionating column packed with stainless steel protruded packing. Two fractions were initially isolated and identified as bicyclo[2.2.1]-hept-5-en-2-yl allyl ether, and the corresponding nortricyclyl allyl ether. The distillation was continued in a smaller column (32 millimeters x 12 inch) and there was obtained 284 grams of a colorless liquid (corresponding to a 13.7 percent yield) boiling at 77° C., and having a refractive index, $N_D^{30}$ of 1.4719–1.4750, which was identified as the diallyl ether of bicyclo[2.2.1]hepta-2,5-diene. The infrared spectrum was consistent with the assigned structure. Analysis of this product by gas liquid chromatography indicated there were four isomers predominant, corresponding to the exo- and endo- forms of both the 2,5- and 2,6-disubstituted product, as well as small amounts of the 2,7-disubstituted product.

*Analysis.*—Calculated for $C_{13}H_{26}O_2$: C, 74.99; H, 9.61. Found: C, 74.72; H, 9.54.

Example II.—2,5(6)-bis(2,3-epoxypropoxy)bicyclo [2.2.1]heptane

To 416 grams (2 moles) of bicyclo[2.2.1]hept-2,5(6) ylene bis(allyl ether), i.e., mixed isomers as prepared in Example I was added dropwise 1622 grams of a 22.5 percent solution of peracetic acid (4.8 moles) in ethyl acetate at 55° C. After 10 hours the reaction mixture was codistilled with ethylbenzene to remove acetic acid and ethyl acetate. Fractionation gave a heads cut consisting of the corresponding monoepoxide, bicyclo[2.2.1] hept-5-en-2-yl 2,3-epoxypropyl ether and 319 grams of a colorless liquid identified as the diepoxide, bicyclo [2.2.1]hept-2,5(6) - ylene bis(2,3 - epoxypropyl ether), corresponding to a 66.5% yield based upon the diene. The product had a boiling point of 140° C. at .05 millimeter of mercury and had a refractive index $N_D^{30}$ 1.4858. The infrared spectrum was consistent with the assigned structure, and gas-liquid chromatography indicated the presence of the four isomers anticipated. Functional group analysis indicated an epoxide purity of about 99 percent.

Example IV.—2,5(6)-bis(3,4-epoxycyclohexyl-methoxy)bicyclo[2.2.1]heptane

To 94 grams (0.29 mole) of 2,5(6) - bis(3 - cyclohexenylmethoxy)bicyclo[2.2.1]heptane was added dropwise 240 grams (0.675 moles) of a 21.4 percent solution of peracetic acid in ethyl acetate over a period of 30 minutes at 35° C.–40° C. After an additional reaction period of 90 minutes, the mixture was dissolved in two parts of cold chloroform. The chloroform solution was washed two times with water, once with $K_2CO_3$, again twice with water, and the organic layer dried over anhydrous $K_2CO_3$. After filtering, volatile material was removed as a rotary evaporator. There was obtained 90 grams of a viscous, almost colorless residue product identified as 2,5(6) - bis(3,4 - epoxycyclohexylmethoxy)bicyclo [2.2.1] heptane. The infrared spectrum was consistent with the assigned structure except for traces of hydroxyl and ester impurities. Functional group analysis indicated a purity of 90 percent.

Example V.—2,5(6)-bis(3,4-epoxycyclohexanoyloxy) bicyclo[2.2.1]heptane

In a manner similar to that in Example III, to 45 grams of 2,5(6) - bis(3 - cyclohexenoyloxy)bicyclo[2.2.1]heptane was added dropwise 106 grams (0.30 moles) of a 21.4 percent solution of peracetic acid. After reaction and purification in a manner similar to Example 3 there was obtained 40 grams of a viscous, almost colorless residue product having a purity of 98 percent as indicated by functional groups analysis for epoxide.

*Analysis.*—Calculated for $C_{21}H_{28}O_6$: C, 67.00; H, 7.50. Found: C, 66.14; H, 7.51.

Examples VI–XV

A series of resins were prepared by curing bicyclo [2.2.1]hept - 2,5(6) - ylene bis(2,3 - epoxypropyl ether), i.e., a mixture of isomers, with various organic hardeners. Results are tabulated in Table below.

TABLE I.—RESINS FROM BICYCLO[2.2.1]HEPT-2,5(6)-YLENE BIS(2,3-EPOXYPROPYL ETHER) AND HARDENER
[Weight of diepoxide in each example was 1.2 grams]

| Example No. | Hardener | Grams | Ratio [1] | Cure, hrs. at temp., ° C. | Resin description | Barcol hardness |
|---|---|---|---|---|---|---|
| VI | Diethylenetriamine | 0.22 | 1.0 | 75 at 25 | Hard, tough, water white | 12± |
| VII | Methylenedianiline | 0.5 | 1.0 | 4 at 80+4 at 120 | Hard, tough transparent, tan. | 10± |
| VIII | Maleic anhydride+ 1,2,6-hexanetriol. | 0.61 0.1 | 1.25 0.2 | 4 at 80+4 at 120 | Hard, tough, transparent, yellow. | 4± |
| IX | Diethylene triamine | 0.22 | 1.0 | 48 at 25 | Clear, tough | 30 |
| X | Methylenedianiline | 0.5 | 1.0 | 18.5 at 25+3 at 80+1 at 170 | Touth, amber | 40 |
| XI | Phthalic anhydride | 1.1 | 1.5 | 2.5 at 120+4 at 160 | Amber, hard | 40 |
| XII | Bisphenol A KOH (17.4% solution) | 0.57 0.007 (KOH) | 0.5 | 5.5 at 80+2 at 120+4 at 160 | Amber, tough | 30 |
| XIII | KOH (17.4% solution) | 0.014 (KOH) | 0.91 | 25 at 80+4 at 160 | Dark amber, slightly brittle | 28 |
| XIV | BF₃ monoethanolamine | 0.06 | 0.05 | 5.5 at 80+2 at 120+4 at 160 | Light amber, hard | 42 |
| XV | Hexanetriol KOH (17.4% solution) | 0.23 0.014 (KOH) | 0.5 | 5.5 at 80+2 at 120+4 at 160 | Dark amber, tough, tacky on bottom and outside surface. | 28 |

[1] Expressed as ratio of active hydrogen groups per epoxide, e.g., as amine-hydrogen or carboxyl groups per one epoxide group for the amine and anhydride respectively.

*Analysis.*—Calculated for $C_{13}H_{20}O_4$: C, 65.00; H, 8.33. Found: C, 64.91; H, 8.46.

Example III.—2,5(6)-bis(3,4-epoxybutanoyloxy) bicyclo[2.2.1]heptane

To 264 grams (1 mole) of 2,5(6)-bis(3-butenoyloxy)-bicyclo[2.2.1]heptane was added dropwise over a 3 hour period, 1086 grams (3 moles) of a 21 percent solution of peracetic acid at 80° C. After an additional 11 hour reaction period at 80° C. the reaction mixture was stripped of volatiles by codistillation with ethylbenzene. Distillation under reduced pressure gave 83 grams of the desired diepoxide, 2,5(6) - bis(3,4 - epoxybutanoyloxy) bicyclo[2.2.1]heptane (mixture of the isomers). The diepoxide had a boiling point of 165° C. to 175° C. at 0.2 millimeter of mercury and had a refractive index, $N_D^{30}$ of 1.4830–42. The infrared spectrum was consistent with the assigned structure and functional group analysis for epoxide indicated a purity greater than 95 percent.

Example XVI

The following illustrates the color stability of resins of the instant invention when exposed to ultraviolet light.

2,5(6) - bis(2,3 - epoxypropoxy)bicyclo[2.2.1]heptane (16.9 grams) and diethylenetriamine (3.1 grams) were placed in a test tube and allowed, after mixing, to stand at room temperature for about 18 hours. Similarly, the diglycidyl ether of bisphenol A (18 grams) and diethylenetriamine (2 grams) were mixed and allowed to stand at 25° C. for about 18 hours.

Both mixtures during this period formed hard resinous products which were placed in a 50° C. mechanically converted oven which was fitted with a Westinghouse 275 watt "RS" type sunlamp. The resin samples were placed five inches from the sunlamp and changes in resin color were observed with the time using a Gardner-Hellige Varnish Comparator (No. 605 VH). This accelerated ultraviolet test showed that after two days the 2,5

(6) - bis(2,3 - epoxypropoxy)bicyclo[2.2.1]heptane had changed from a Gardner color of 1 to 1+ while the conventional epoxy resin system had changed from 3 to 5. These data therefore illustrate the superior initial color and color stability, in the presence of heat and ultra violet, of resins based on the novel diepoxides of this invention and amines versus resins based on the diglycidyl ether of bisphenol A and amines.

Example XVII

A solution was made up containing 15.5% of bicyclo [2.2.1]hep - 2,5 - ylene bis - 2,3 - epoxypropyl ether, 2.1% zinc fluoborate, 0.3% zinc oxide, 21% water and the remainder ethanol. A piece of unmercerized 80 x 80 cotton printcloth was immersed in this solution and padded using one dip and one nip; the wet pick-up was approximately 100%. After padding, the fabric was allowed to dry in air at room temperature of about 25° C. to 30° C.; the time required to dry the fabric was approximately 20 minutes. After drying, the fabric was cured at 120° C. for 3 minutes. Next, the fabric was washed, dried and conditioned. The treated fabric had an add-on of 9.5%, a dry wrap crease recovery of 72%, and tumble-dry and spin-dry wash-wear indices of 5— and 2+, respectively. The fabric retained 55% of its original filling breaking strength, and had a soft hand.

A piece of the same untreated cotton was evaluated and found to have a dry warp crease recovery of 42%, tumble-dry and spin-dry wash-wear indices of 1- and 37 lbs. filling breaking strength.

Example XVIII

A solution was prepared as described in Example XVII, except that the concentration the resin was 7.8%. A piece of the same untreated cotton, described in Example XVII, was padded to approximately 100% wet pick-up with the above solution, air dried and cured as described in Example I. After laundering and conditioning, the sample was evaluated. The add-on was 4.8%, the dry warp crease recovery 65%, the tumble-dry and spin-dry wash-wear indices 3+ and 1+, respectively and the filling breaking strength retention 55%; the fabric had a soft hand.

Example XIX.—3,8(9)-bis(2,3-epoxypropoxy)tricyclo [5.2.1.0$^{2,6}$]decane

Tricyclo[5.2.1.0$^{2,6}$]deca-3,8-diene is contacted with a molar excess of carbon monoxide and hydrogen in the presence of decobalt octacarbonyl at elevated temperature and pressure. The hydroformylated product, tricyclo [5.2.1.0$^{2,6}$]decan-3,8(9)-diol is a mixture of the dialdehyde isomers. The dialdehyde is contacted with excess hydrogen in the presence of Raney nickel to produce a mixture of the 3,8- and 3,9-isomers of tricyclo[5.2.1.0$^{2,6}$] decanediol.

One mole of the tricyclo[5.2.1.0$^{2,6}$]decane-3,8(9)-diol so produced is contacted with allyl chloride in the presence of sodium hydroxide. The reaction product mixture is neutralized and distillation yields 3,8(9)-bis(allyloxy) tricyclo[5.2.1.0$^{2,6}$]decane. Epoxidation of the diallylic precursor with excess peracetic acid yields 3,8(9)-bis (2,3 - epoxypropoxy)tricyclo[2.2.1]heptane (mixture of isomers).

Example XX.—3,9(10)-bis(2,3-epoxypropoxy)pentacyclo [10.2.1.1$^{8,11}$.0$^{5,13}$.0$^{7,12}$]pentadecane 8-hydroxytricyclo[5.2.1.0$^{2,6}$]decane is contacted with an equimolar amount of cyclopentadiene at elevated temperatures to effect the Diels-Alder synthesis of 3-hydroxypentacyclo[10.2.1.1$^{8,11}$.0$^{5,13}$.0$^{7,12}$]pentadec - 9 - ene which is contacted with an equimolar amount of allyl alcohol in the presence of a Lewis acid catalyst produce the 3 - hydroxy - 9(10)allyloxy derivative (mixture of isomers). The reaction mixture is neutralized and further reacted with allyl chloride in the presence of a base such as NaOH to yield 3,9(10) - bis(allyloxy)pentacyclo [10.2.1.1$^{8,11}$.0$^{5,13}$.0$^{7,12}$]pentadecane (mixture of isomers) which are then epoxidized with peracetic acid to produce 3,9(10) - bis(2,3 - epoxypropoxy)pentacyclo [10.2.1.1$^{8,11}$.0$^{5,13}$.0$^{7,12}$]pentadecane which is a mixture of the 3,9- and 3,10 substituted isomers. Analysis shows the presence of both the exo and endo forms of the isomers.

Example XXI.—4,11(12)-bis(2,3-epoxypropoxymethyl) pentacyclo[6.6.1.0$^{2,7}$.0$^{9,14}$]pentadecane Pentacyclo[6.6.1.0$^{2,7}$.0$^{9,14}$]pentadeca-4,11-diene is contacted with carbon monoxide and hydrogen under hydroformylating conditions to produce a mixture of the 4,11- and 4,12-hydroxymethyl substituted derivatives. The product is contacted with epichlorohydrin in the presence of sulfuric acid to produce the dihalohydrin, neutralized, and is subsequently dehydrochlorinated with sodium hydroxide in amounts providing two moles of sodium hydroxide for each mole of the dihalohydrin. The product of the dehydrochlorination is a mixture of isomers corresponding to 4,11(12) - bis(2,3 - epoxypropoxymethyl) pentacyclo[6.6.1.0$^{2,7}$.0$^{9,14}$]pentadecane, in both the exo and endo isomeric forms.

What is claimed is:

1. A polyepoxide compound containing from 2 to 4 vicinal epoxy groups existing on saturated aliphatic substituents containing from 2 to 18 carbon atoms, said substituents being bonded through a bivalent linking radical selected from the group consisting of oxy, carbonyloxy and oxyalkylene and carbonyloxyalkylene containing from 1 to 4 carbon atoms to a fused homocarbocyclic ring structure containing from 4 to 6 carbocycles, and free of additional substitution other than alkyl substitution wherein the alkyl group contains from 1 to 4 carbon atoms, said fused homocarbocyclic ring being selected from the group consisting of the bicyclo[2.2.1] heptyl ring and fused homocarbocyclic rings of which at least one bicyclo[2.2.1]heptyl structure is an integral part.

2. A polyepoxide compound containing from 2 to 4 vicinal epoxide groups existing on saturated aliphatic substituents containing from 2 to 18 carbon atoms, said substituents being bonded through a bivalent linking radical selected from the group consisting of oxy, carbonyloxy and oxyalkylene and carbonyloxyalkylene containing from 1 to 4 carbon atoms to a bicyclo[2.2.1]heptyl ring free of additional substitution other than alkyl substitution wherein the alkyl group contains from 1 to 4 carbon atoms.

3. The polyepoxide compound of claim 2 wherein the epoxide groups exist as 2,3-epoxypropyl groups bonded to the bicyclo[2.2.1]heptyl ring structure through an oxy group.

4. The polyepoxide compound of claim 2 wherein the epoxide groups exist as 2,3-epoxypropyl groups bonded to the bicyclo[2.2.1]heptyl ring structure through an oxymethylene group.

5. The polyepoxide compound of claim 1 wherein the epoxide groups exist as 2,3-epoxypropyl groups bonded to the fused homocarbocyclic ring through an oxy group.

6. The polyepoxide compound of claim 1 wherein the epoxide groups exist as 2,3-epoxypropyl groups bonded to the fused homocarbocyclic ring through an oxymethylene group.

7. The polyepoxide of claim 1 wherein the fused homocarbocyclic ring is a tricyclo[5.2.1.0$^{2,6}$]decyl ring.

8. The polyepoxide of claim 1 wherein the fused homocarbocyclic ring is a pentacyclo[9.2.1.1$^{5,8}$.0$^{2,10}$.0$^{4,9}$] pentadecyl ring.

9. The polyepoxide of claim 1 wherein the fused homocarbocyclic ring is a pentacyclo[10.2.1.1$^{5,8}$.0$^{2,11}$.0$^{4,9}$] hexadecyl ring.

10. A polyepoxide containing 2 to 4 vicinal epoxy groups existing on 2,3-epoxypropyl substituents bonded through an oxy group to a tricyclo[6.2.1.0$^{2,7}$]undecyl ring free from additional substituents other than alkyl substituents containing from 1 to 4 carbon atoms.

11. A polyepoxide containing 2 to 4 vicinal epoxy groups existing on 2,3-epoxypropyl substituents bonded through an oxy group to a tetracyclo[6.2.1.1$^{3,6}$.0$^{2,7}$]dodecyl ring free from additional substituents other than alkyl substituents containing from 1 to 4 carbon atoms.

12. 2,5-bis(2,3-epoxypropoxy)bicyclo[2.2.1]heptane.

13. 2,5 - bis(2,3 - epoxypropoxymethyl)bicyclo[2.2.1]heptane.

14. 2,9-bis(2,3 - epoxypropoxymethyl)tricyclo[5.2.1.0$^{2,6}$]decane.

15. A homopolymer of a polyepoxide containing from 2 to 4 vicinal epoxide groups existing on saturated aliphatic substituents containing from 2 to 18 carbon atoms, said substituents being bonded through a bivalet linking radical selected from the group consisting of oxy, carbonyloxy and oxyalkylene and carbonyloxyalkylene containing from 1 to 4 carbon atoms to a bicyclo[2.2.1]heptyl ring free of additional substitution other than alkyl substitution wherein the alkyl group contains from 1 to 4 carbon atoms.

16. The homopolymer of claim 15 wherein the epoxide groups of the polyepoxide are 2,3-epoxypropyl groups.

17. A homopolymer of a polyepoxide containing from 2 to 4 epoxide groups existing on saturated aliphatic substituents containing from 2 to 18 carbon atoms, the said substituents being bonded through a bivalent linking radical selected from the group consisting of oxy, carbonyloxy, oxyalkylene, and carbonyloxyalkylene to a fused homocarbocyclic ring containing from 4 to 6 carbocycles each containing 5 to 6 carbon atoms, said fused homocarbocyclic ring being free of additional substitution other than alkyl substitution wherein the alkyl group contains from 1 to 4 carbon atoms.

18. The homopolymer of claim 17 wherein the epoxide groups of the polyepoxide are 2,3-epoxypropyl groups.

19. A curable composition comprising (1) a polyepoxide compound containing from 2 to 4 vicinal epoxy groups existing on saturated aliphatic substituents containing from 2 to 18 carbon atoms, said substituents being bonded through a bivalent linking radical selected from the group consisting of oxy, carbonyloxy and oxyalkylene and carbonyloxyalkylene containing from 1 to 4 carbon atoms to a fused homocarbocyclic ring structure containing from 4 to 6 carbocycles, and free of additional substitution other than alkyl substitution wherein the alkyl group contains from 1 to 4 carbon atoms, said fused homocarbocyclic ring being selected from the group consisting of the bicyclo[2.2.1]heptyl ring and fuse homocarbocyclic rings of which at least one bicyclo[2.2.1]heptyl structure is an integral part, and (2) a curing amount of a hardener selected from the group consisting of polycarboxylic acids, polycarboxylic acid anhydrides, polyols, and polyisocyanates, and polyfunctional amines.

20. The cured thermoset resin obtained from the curable composition of claim 19.

21. The curable composition of claim 19 wherein the hardener is a polycarboxylic acid present in such relative amounts as to provide from about 0.1 to about 2.0 carboxy groups of said polycarboxylic acid per epoxy group of said polyepoxide.

22. The curable composition of claim 19 wherein the hardener is a polycarboxylic acid anhydride present in such relative amounts as to provide from about 0.1 to about 4.0 carboxy groups of said polycarboxylic acid anhydride per epoxy group of the polyepoxide.

23. The curable composition of claim 19 wherein the hardener is a polyol present in such relative amounts so as to provide from about 0.1 to about 2.0 hydroxy groups of said polyol per epoxy group of said polyepoxide.

24. The curable composition of claim 19 wherein the hardener is a polyfunctional amine present in such relative amounts so as to provide about 0.2 to about 5.0 amino hydrogen groups of said polyfunctional amine per epoxy group of said polyepoxide.

25. A curable composition comprising (1) a polyepoxide containing from 2 to 4 vicinal epoxy groups existing on 2,3-epoxypropyl substituents bonded through a bivalent linking radical selected from the group consisting of oxy, carbonyloxy and oxylalkylene and carbonyloxyalkylene containing from 1 to 4 carbon atoms to a bicyclo[2.2.1] heptyl ring free from additional substitution other than substitution of alkyl groups containing 1 to 4 carbon atoms, and (2) a curing amount of an organic hardener selected from the group consisting of polycarboxylic acids, polycarboxylic acid anhydrides, polyols, polyisocyanates and polyfunctional amines.

26. The cured thermoset composition of claim 25.

27. The curable composition of claim 25 wherein the organic hardener is diethylenetriamine present in an amount so as to provide about 0.2 to about 5.0 amino hydrogen group of said polyfunctional amine per epoxy group of the polyepoxide.

References Cited

UNITED STATES PATENTS 2,886,472  5/1959  Condo et al. _____ 260—2

FOREIGN PATENTS 1,309,511  10/1962  France.

WILLIAM H. SHORT, *Primary Examiner.*

T. PERTILLA, *Assistant Examiner.*